United States Patent [19]
Yamada

[11] Patent Number: 6,052,154
[45] Date of Patent: Apr. 18, 2000

[54] IMAGE PROCESSING DEVICE WITH EXPANDER MINIMIZING MEMORY REQUIREMENTS FOR OBTAINING MULTIPLE SUB WINDOW IMAGE DATA

[75] Inventor: Tatsuhiro Yamada, Tokyo, Japan

[73] Assignee: Mitsubishi Denki Kabushiki Kaisha, Tokyo, Japan

[21] Appl. No.: 08/888,352

[22] Filed: Jul. 3, 1997

[30] Foreign Application Priority Data

Feb. 19, 1997 [JP] Japan ..................................... 9-034892

[51] Int. Cl.[7] ....................................................... H04N 5/44
[52] U.S. Cl. ........................... 348/564; 348/565; 348/568
[58] Field of Search .................................. 348/564, 565, 348/566, 567, 568, 581, 704, 572, 571, 588, 705; 345/332, 340, 343, 344, 345; 382/276; H04N 5/45

[56] References Cited

U.S. PATENT DOCUMENTS

| | | | |
|---|---|---|---|
| 5,398,074 | 3/1995 | Duffield | 348/564 |
| 5,680,177 | 10/1997 | Abe | 348/564 |
| 5,729,300 | 3/1998 | Ahn | 348/564 |
| 5,852,474 | 12/1998 | Nakagaki | 348/564 |
| 5,917,958 | 6/1999 | Nunally | 382/276 |

FOREIGN PATENT DOCUMENTS

| | | |
|---|---|---|
| 63-123284 | 5/1988 | Japan . |
| 530440 | 2/1993 | Japan . |

*Primary Examiner*—John K. Peng
*Assistant Examiner*—Wesner Sajous
*Attorney, Agent, or Firm*—Leydig, Voit & Mayer, Ltd.

[57] ABSTRACT

An image processing device for displaying a sub window of second video data on one part of a main screen by switching first video data for the entire screen and the second video data for the sub window includes an analog-to-digital converter for digitizing the second video data and a data sampling circuit for sampling and compressing the digitized video data at a subsampling frequency. The device further includes a memory for reading out and storing the compressed data sampled in the data sampling circuit; a first switching circuit including a data expansion circuit for generating video data for the sub window by expanding the image data read from the memory; a digital-to-analog converter for converting the image data expanded in the data expansion circuit to obtain analog data; and a second switching circuit for switching the video data for a sub window output from the digital-to-analog converter to insert the video data in the sub window into the first video data. The first switch controls whether the data read from the memory are expanded for one size sub window or not expanded for another size sub window.

8 Claims, 9 Drawing Sheets

IMAGE PROCESSING DEVICE WITH EXPANDER MINIMIZING MEMORY REQUIREMENTS FOR OBTAINING MULTIPLE SUB WINDOW IMAGE DATA

BACKGROUND OF THE INVENTION

1. Field of the Invention

The present invention relates to an image processing device. More particularly, the present invention relates to an image processing device for displaying a sub screen within a main screen.

2. Description of the Prior Art

In a conventional image processing device for displaying a sub screen (or "sub window") within a main screen, the sub window having the area either ⅑ or ¹⁄₁₆ of the main screen is selected. In this case, an (⅑) sub window is subsampled at the frequency $f_{sub}/3$ and written in a memory, an (¹⁄₁₆) sub window is subsampled at $f_{sub}/4$ and written in the memory, and these sub windows are read out at $f_{main}$, where, $f_{sub}$ is a subsampling frequency of the sub window and is 14.318 MHz, and $f_{main}$ is a subsampling frequency of the main screen and is 14.318 Mhz, the same as the subsampling frequency of the sub window. The frequencies of $f_{main}$ and $f_{sub}$ are the same, but they are not synchronized.

Figure 7:
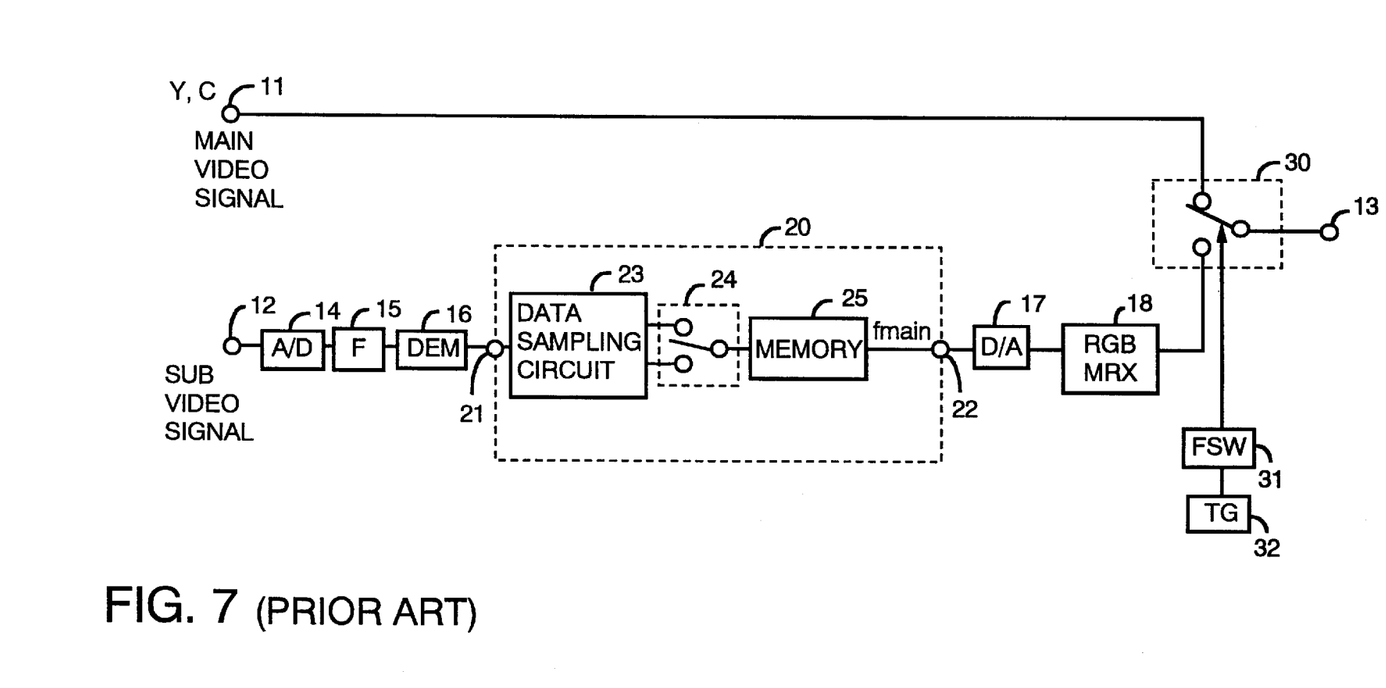
FIG. 7 shows a conventional image processing device for displaying a sub window in a main screen.

FIG. 7 shows a conventional image processing device for displaying a sub window within a main screen. In FIG. 7, a main video signal input terminal 11 is supplied with a main video signal in order to display an image on the main screen, where the main video signal comprises an intensity signal Y and a color signal C. A sub video signal input terminal 12 is supplied with a sub video signal for displaying the image on the sub window, where the sub video signal is a composite video signal. An analog-to-digital converter 14 converts the analog composite video signal input from the sub video signal input terminal to a digital signal. A Y/C separation filter 15 separates the intensity signal Y and the chrominance signal (B-Y and R-Y) from the digital signal produced by the analog-to-digital converter 14, where B indicates a blue signal component and R indicates a red signal component. A color demodulating circuit 16 converts the color signal C into chrominance signals B-Y and R-Y.

The conventional image processing device of FIG. 7 further comprises a window size converting circuit 20, an input terminal 21 for supplying the chrominance signals B-Y and R-Y to the window size converting circuit 20, an output terminal 22 of the window size converting circuit 20, and a data sampling circuit 23 for sampling the respective intensity component Y of the sub video signal and the chrominance components B-Y and R-Y input from the input terminal 21. The data sampling circuit 23 samples the (⅑) sub window by (⅓) $f_{sub}$, and compresses the pixels of the respective horizontal scanning lines to ⅓. The data sampling circuit 23 samples the (¹⁄₁₆) sub window by (¼) $f_{sub}$, and compresses the pixels of the respective horizontal scanning lines to ¼. The compressed image data is read out through a switch 24, and is stored in a memory 25. The image data stored in the memory 25 is read out at the frequency $f_{main}$, and the chrominance signals (B-Y and R-Y) of the stored image data are converted into an analog signal by digital-to-analog "D/A" converter 17. Then, the color signal C is mixed with an intensity signal Y in an RGB matrix circuit 18 to form Y and C video signals. The sub video signal output from the matrix circuit 18 is inserted into the main video signal output from the main video signal input terminal 11 by a switch 30. In this manner, the sub window is inserted into the main screen, and the main video signal and the sub video signal inserted into the main video signal are output to the output terminal 13.

Figure 8A:
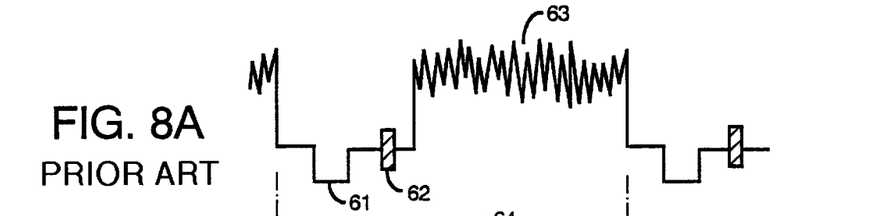
Figure 8B:
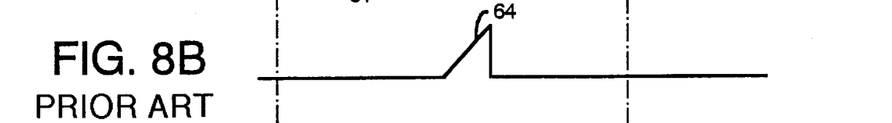
Figure 8C:
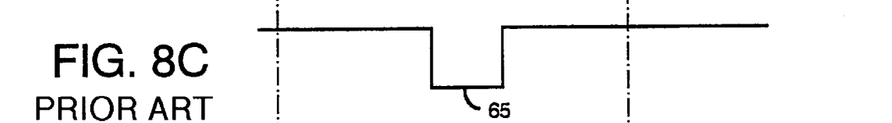
Figure 8D:
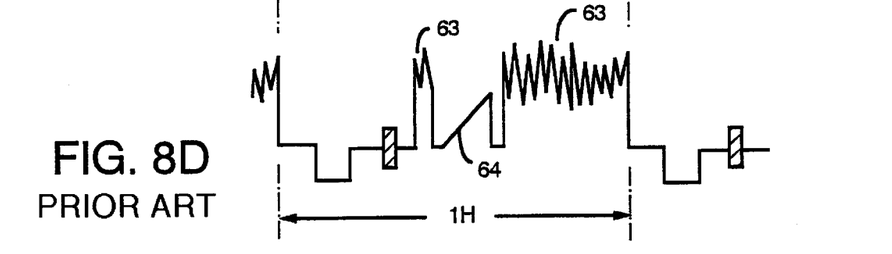

FIGS. 8A–8D are timing charts of respective signals for inserting a sub window into the main screen. FIG. 8A shows the main video signal input from the main video signal input terminal 11 of FIG. 7. In FIG. 8A, a horizontal synchronization pulse 61 is for horizontal synchronization, a color burst signal 62 is for transmitting information concerning the color signals, and an image signal 63 is for displaying the image on the main screen. FIG. 8B shows a sub video signal 64. The sub video signal 64 has an image signal, as shown by the saw-tooth waveform, which exists only in the portion where the image is displayed on the sub window. FIG. 8C shows a main screen punching signal 65 for inserting the sub window in the main screen. The main screen punching signal 65 is generated by a timing generator (TG) 32. A high speed switch (FSW) 31 controls switching of the switch 30 to the sub video signal side during the period when the main screen punching signal 65 is logic "L", and switching of the switch 30 to the main video signal side during the period when the main screen punching signal 65 is logic "H". FIG. 8D shows a signal during one horizontal scanning line when the main video signal and the sub video signal are superimposed. As FIG. 8D shows, the switch 30 switches to insert the sub video signal 64 in the image signal 63 for displaying the image on the main screen.

Figure 9A:
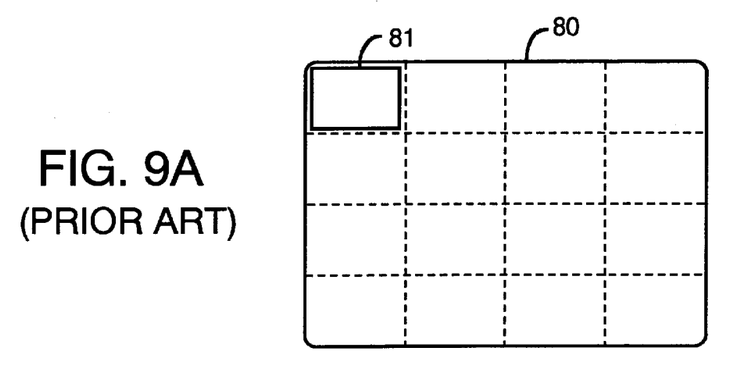
FIGS. 9A and B show main screens having a sub window inserted in the main screen, respectively.
Figure 9B:
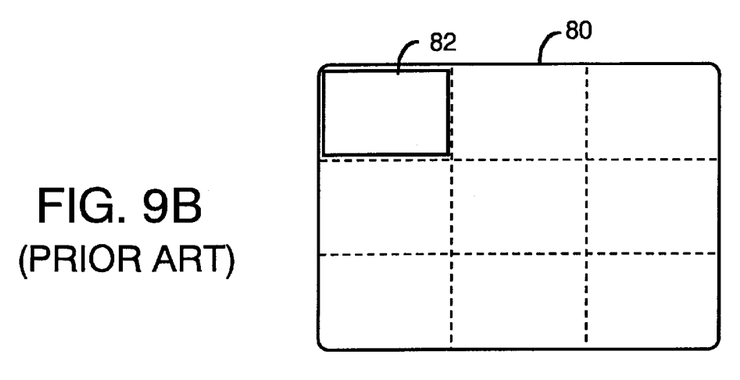

FIGS. 9A and 9B show the sub windows which are placed in the main screen. In FIG. 9A, a sub window 81 having ¹⁄₁₆ the area of a main screen 80 is illustrated. In FIG. 9B, a sub window 82 having ⅑ the area of a main screen 80 is illustrated. As explained above, in the conventional image processing device, the sub video signal for sub window having ¹⁄₁₆ the area of the main screen or having ⅑ the area of the main screen have been switched and written in the memory as needed, and the written signal is read out and displayed on the main screen.

However, in an image processing device such as one shown in FIG. 7, it is necessary to use a memory having a large capacity for the memory 25, that is, a memory needed for the ⅑ area of the main screen which can memorize the compressed sub video signal, for example, for one scanning line. When integrating this memory 25 in an IC, it is difficult to reduce the size of the IC, because the size of the IC chip increases in accordance with the size of memory capacity.

SUMMARY OF THE INVENTION

It is an object of the present invention to provides an image processing device for storing a sub video signal (for example, for one scanning line) for the sub window which has ¹⁄₁₆ the area of the main screen, and reading out the data from the memory and expanding the read out data when ⅑ sub window video data is needed, and for reading out data from the memory and outputting the read out data without expansion when ¹⁄₁₆ sub window video data is needed, whereby either the sub video data for ⅑ sub window or the sub video data for ¹⁄₁₆ sub window can be obtained, which reduces the capacity of the memory.

According to one aspect of the invention, an image processing device for displaying a sub window of second video data on one part of a main screen by switching first video data for the entire screen and the second video data for the sub window, the image processing device comprising: an analog-to-digital converter for digitizing the second video data; a data sampling circuit for sampling and compressing the digitized second video data at a subsampling frequency ($f_{sub}$) of the second video data; a memory for reading out and writing in sampled and compressed digitized video data from the data sampling circuit at the frequency (1/n) $f_{sub}$, where n is a positive integer; a data expansion circuit for generating video data for the sub window by expanding image data read out from the memory at m/n of the sub-sampling frequency ($f_{main}$) of the first video data n/m times, where m is a positive integer; a digital-to-analog converter for converting the image data expanded by the data expansion circuit to obtain analog data; and a first switching circuit for switching video data for sub window output from the digital-to-analog converter to be inserted into the first video data.

According to another aspect of the invention, the image processing device further comprises: a second switching circuit for reading out data from the memory at the frequency (m/n) $f_{main}$, and expanding the data in the data expansion circuit to generate $1/m^2$ sub window video data, and for reading out data from the memory at the frequency $f_{main}$ and outputting the data without expansion to generate $1/n^2$ sub window video data is generated, wherein either sub video data for a $1/m^2$ sub window or sub video data for a $1/n^2$ may be generated.

Preferably, in the data expansion circuit, the image data signals are obtained in the formula below when the input image data signal is Yi (i=positive integers of 0, 1, 2, 3 ...) of $Yj=Yj$, $X(j+1)=\frac{1}{2}(\frac{1}{2}Y j+\frac{3}{2}Y(j+1))$, $X(j+2)=(Y(j+1)+Y(j+2))$, $X(j+3)=\frac{1}{2}(\frac{3}{2}Y(j+2)+\frac{1}{2}Y(j+3))$, where, j=3i=0, 3, 6, 9, 12, ...

According to a further aspect of the invention, an image processing device includes a first path for directly outputting an input image data signal; a second path including a first multiplying circuit for multiplying the input image data signal by a first constant defined by a first control signal to produce a first product, a second multiplying circuit for multiplying the input image data signal by a second constant defined by a second control signal to produce a second product, an adder for adding the first and second products to produce a sum, and a circuit for dividing the sum by ½; and a second switching circuit for selecting the first path or the second path.

According to a still further aspect of the invention, an image processing device includes a first D flip-flop for receiving the input image signal at a first input terminal, and receiving a first control signal at a second input terminal, and outputting a received input image signal from an output terminal according to the first control signal; a second D flip-flop for receiving the input image signal at a first input terminal and receiving a second control signal at a second input terminal, and outputting the input image signal from an output terminal according to the second control signal; a first switching circuit for selecting an output signal of the first D flip-flop and the output of the second D flip-flop according to a third control signal; a first multiplier for multiplying the input image signal by a constant corresponding to a value of a fourth control signal; a second multiplier for multiplying the input image signal by a constant corresponding to a value of a fifth control signal; a third D flip-flop for latching an output of the first multiplier, a fourth D flip-flop for latching an output of the second multiplier, a second switching circuit for selecting the output of the first switch or the output of the third D flip-flop according to a sixth control signal; an adder for adding outputs of the third D flip-flop and the fourth D flip-flop; a fifth D flip-flop for latching the output of the second switch according to a seventh control signal; a third switching circuit for selecting an output of the fifth flip-flop or the output of the adder according to an eighth control signal; and a sixth D flip-flop for latching an output of the third switching circuit wherein the input image signal is expanded by ⁴⁄₃ according to the first-eighth control signals.

Preferably, the first and the second multipliers in the data expansion circuit multiply the constant corresponding to the control signal by the input image signal. The first and second constants correspond to values of the control signal input into the second input terminals of the first and second multiplying circuits as below.

| Values of first and second control signals | First and second constants |
| --- | --- |
| 0 | 0 |
| 1 | 1/2 |
| 2 | 1 |
| 3 | 3/2 |

BRIEF DESCRIPTION OF THE DRAWINGS

FIGS. 8A~8D are timing charts of respective signals when a sub window is inserted into the main screen.

DETAILED DESCRIPTION OF THE PREFERRED EMBODIMENTS

Embodiment 1

Figure 1:
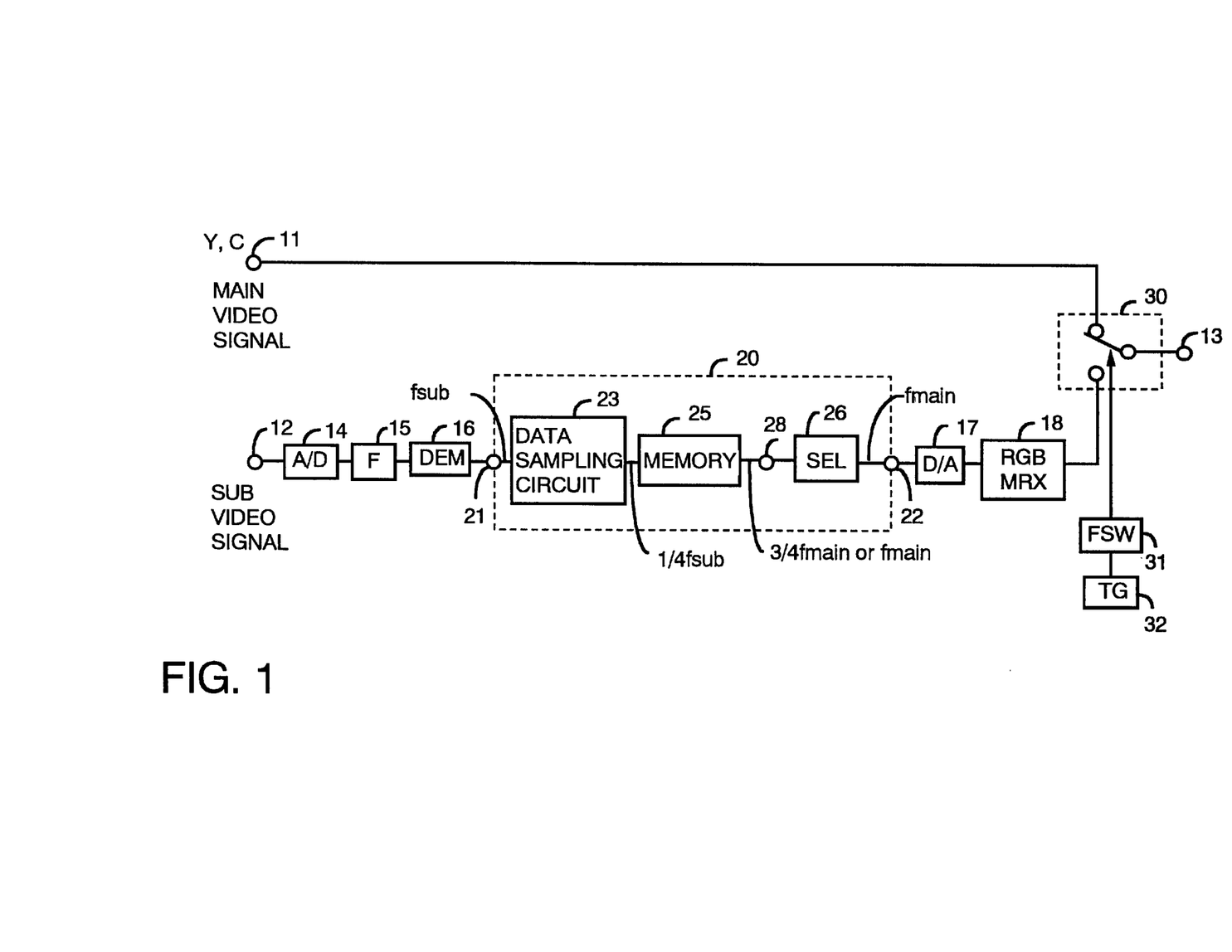
FIG. 1 shows an image processing device according to a first embodiment of the present invention.

FIG. 1 shows an image processing device according to a first embodiment of the present invention. Numerical references 13, 17, 18, and 30–32 function identically to their counterparts with the same reference numbers described with respect to FIG. 7 and therefore a duplicate description of those elements is omitted. In FIG. 1, a main signal input terminal 11 is supplied with a main video signal in order to display the image on the main screen. The main video signal consists of an intensity signal Y and a color signal C. A sub video signal input terminal 12 is supplied with a sub video signal for displaying a sub window. The sub video signal is a composite video signal. An analog-to-digital converter 14 converts the analog composite video signal input from the sub video signal input terminal into a digital signal. A Y/C separation filter 15 separates the intensity signal Y and the chrominance signal (B-Y and R-Y) from the digital signal obtained from the analog-to-digital converter 14. B is a blue signal component and R is a red signal component. A color demodulating circuit 16 converts the color signal C into chrominance signals B-Y and R-Y.

The image processing device according to the first embodiment further comprises a window size converting circuit 20, an input terminal 21 for supplying the chrominance signals B-Y and R-Y to the window size converting circuit 20, an output terminal 22 of the window size converting circuit 20, and a data sampling circuitry 23 for sampling the respective intensity component Y of the sub video signal and the chrominance components B-Y and R-Y input from the input terminal 21. The data sampling circuit 23 samples the respective intensity component and chrominance components B-Y and R-Y at the frequency ¼ $f_{sub}$, and compresses the pixels of the respective components to ¼, in order to form the (¹⁄₁₆) sub window signal. These compressed image data are stored in the memory 25. The image signal stored in the memory 25 is read out at either ¾ of the $f_{main}$ signal frequency or at the frequency $f_{main}$. Then the image signal is provided to the input terminal 28 of a switching circuit (SEL) 26 as an image signal of the sub video signal either for the (⅑) sub window or for the (¹⁄₁₆) sub window, respectively.

As explained above, the image signal is written in the memory 25 at the frequency $f_{sub}$, and read out at the frequency $f_{main}$. $f_{sub}$ is a subsampling frequency for the image signal for the sub window, and $f_{main}$ is a subsampling frequency of the image signal for the main screen. The respective frequencies $f_{sub}$ and $f_{main}$ are not synchronous because $f_{sub}$ and $f_{main}$ are generated by different sources; however, $f_{sub}$ and $f_{main}$ are both 14.318 MHz. Assuming that the effective image data period (the time period while the image is displayed in the window during one horizontal period) is, for example, 80% of the one horizontal period, the number of the pixels written in the memory 25 is 182 pixels/horizontal period. If the data which is written in the memory 25 is expanded at a frequency ¾ $f_{main}$, 182×⅓=242 pixels/horizontal period is needed. That is, since the compression ratio in this case is ⅓, the sub window having ⅑ the size of the main screen is formed.

Figure 2:
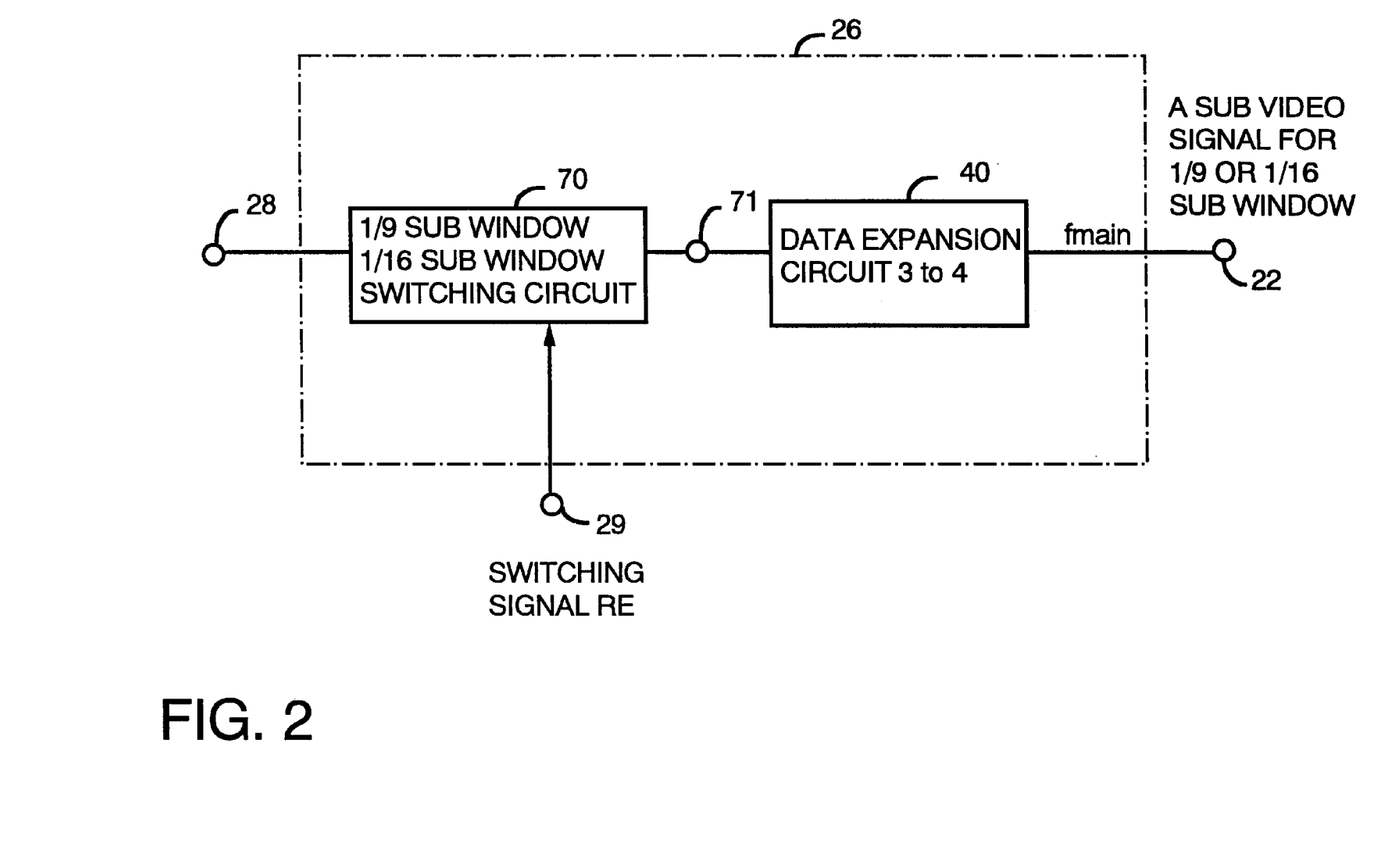
FIG. 2 shows a switching circuit.

FIG. 2 shows the switching circuit 26. The switching circuit 26 of FIG. 2 comprises an input terminal 28 for receiving the image signal read from the memory 25, a switching circuit 70 for switching the sub video signal for the (⅑) sub window and for the (¹⁄₁₆) sub window, a switching terminal 29 for switching the sub video signal for the (⅑) sub window and for the (¹⁄₁₆) sub window. The switching circuit 26 further comprises a data expansion circuit 40 for expanding the sub video signal read from the memory 25 by ⁴⁄₃ and outputting the result when the (⅑) sub window switching signal is input, and for outputting the sub video signal read out from the memory 25 without extension when the (¹⁄₁₆) sub window switching signal is input. The switching circuit 26 further comprises an output terminal 22 for outputting the sub video signal for the (⅑) sub video window or the sub video signal for the (¹⁄₁₆) sub video window obtained at the data expansion circuit 40. The sub video signal for the (⅑) sub window has 242 pixels for every horizontal scanning time (H), and the sub video signal for the (¹⁄₁₆) sub window has 182 pixels for every horizontal scanning time (H). The construction and operation of the data expansion circuit 40 are explained below.

Figure 3:
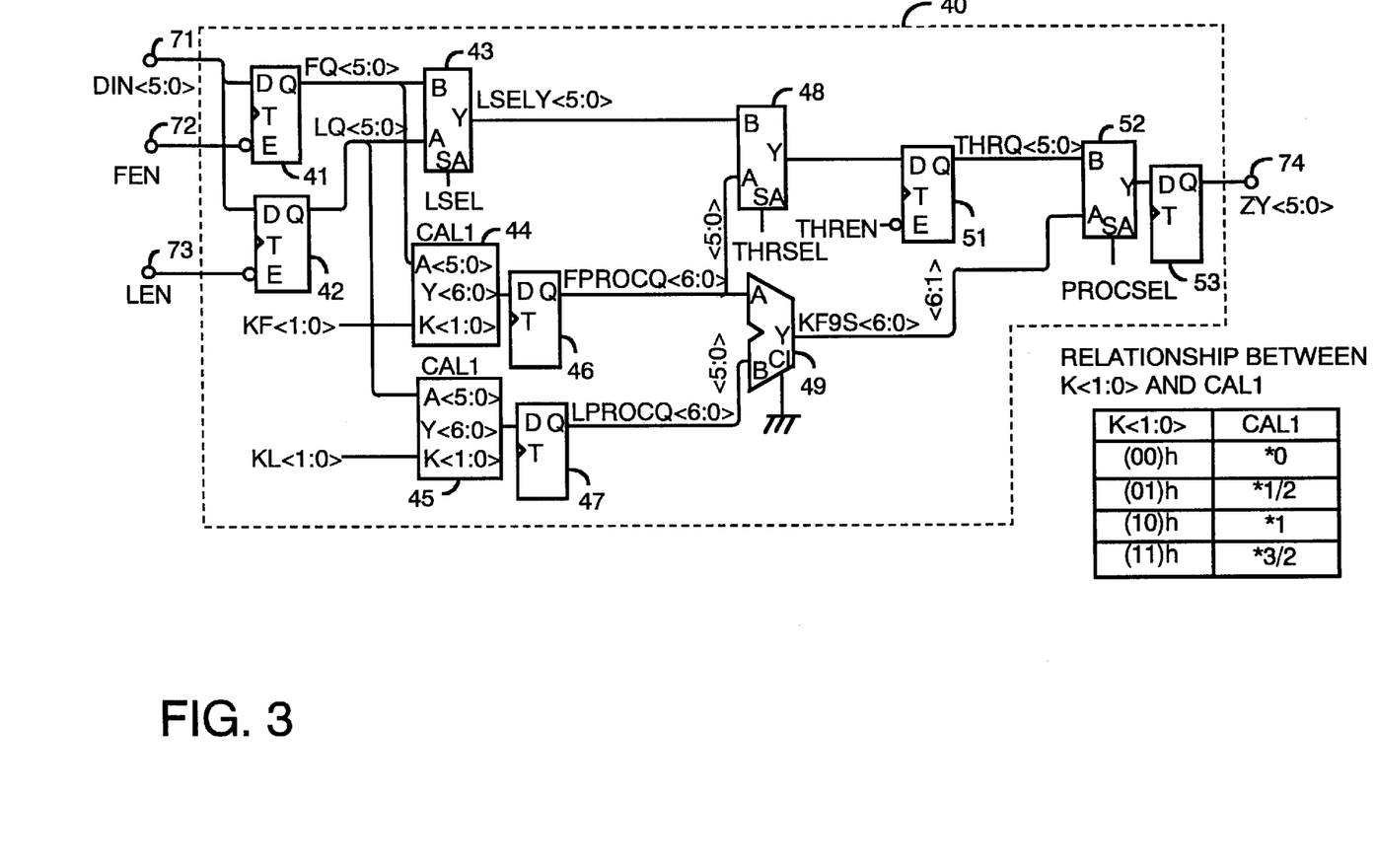
FIG. 3 shows a data expansion circuit.
Figure 4:
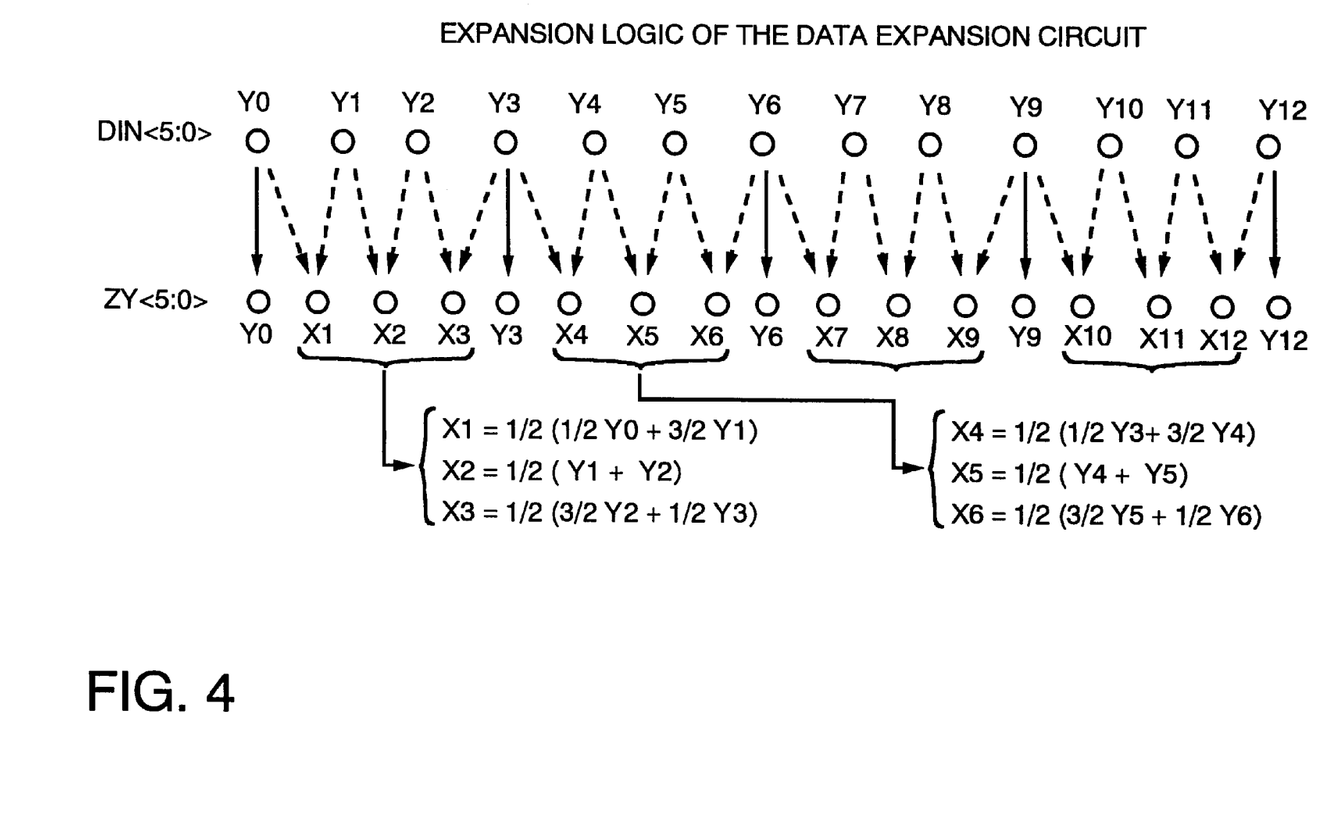
FIG. 4 explains the logic of a data expansion which generates an (⅑) sub window signal from an (¹⁄₁₆) sub window signal.
Figures 5A, 5C, 5D, 5E, 5F, 5G, 5H, 5I, 5J, 5K, 5L, 5M, 5N, 5O, 5P, 5Q, 5R:
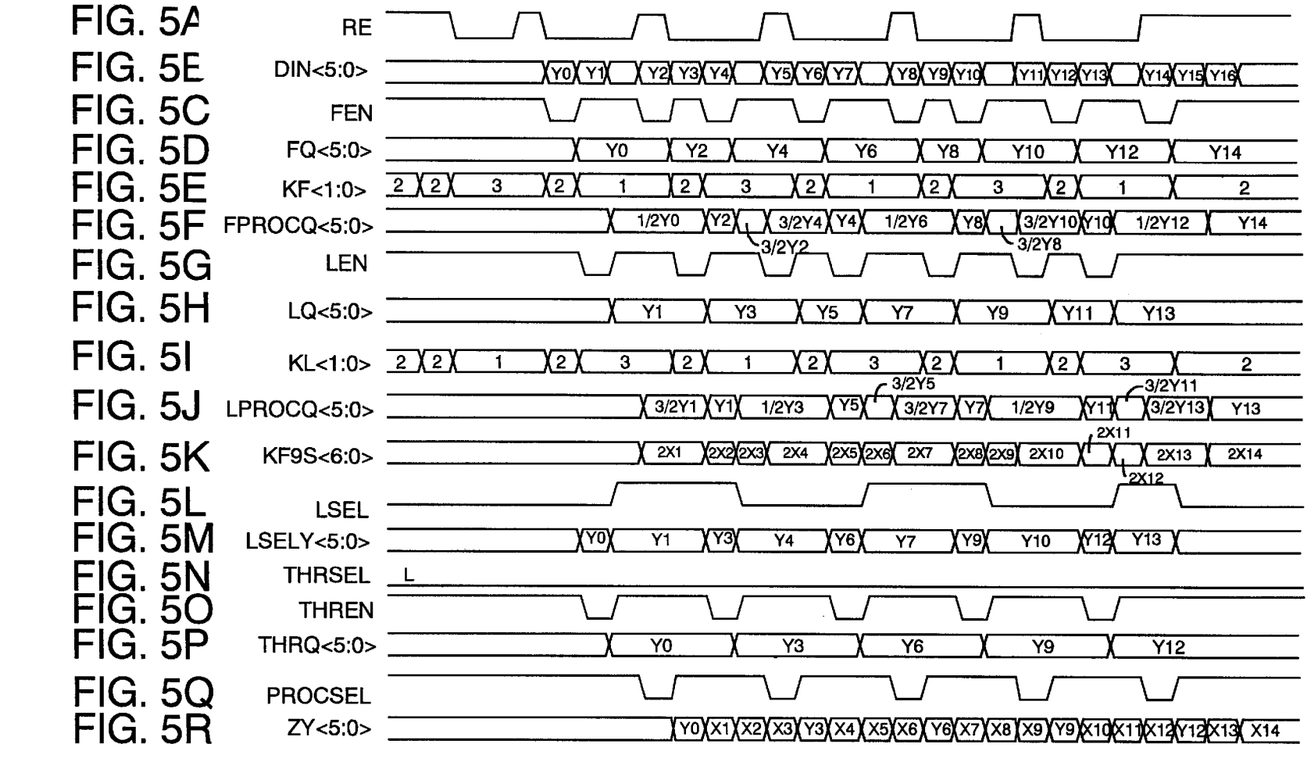
FIGS. 5A~5R are timing charts for the data expansion circuit during generation of the sub video signal for the (⅑) sub window.
Figures 6A, 6B:
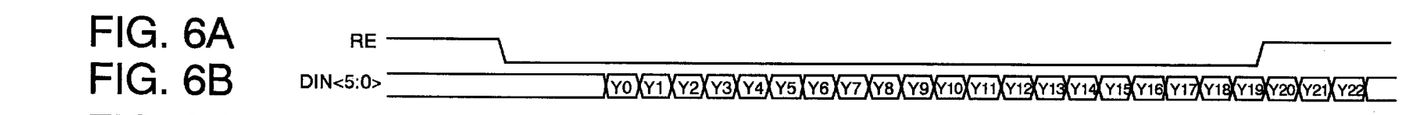
FIGS. 6A~6R are timing charts of the data expansion circuit during generation of the sub video signal for the (¹⁄₁₆) sub window.
Figure 6C:
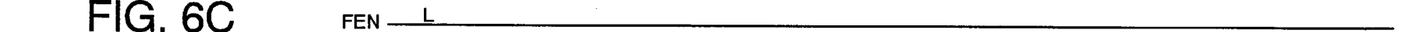
Figure 6D:
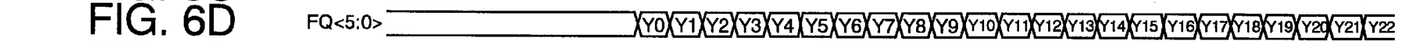
Figure 6E:
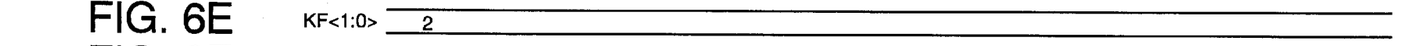
Figure 6F:
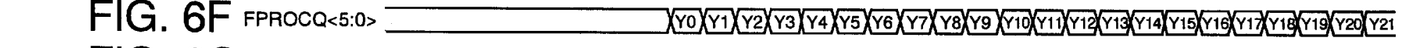
Figure 6G:
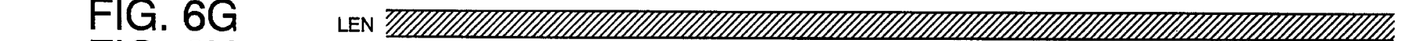
Figure 6H:
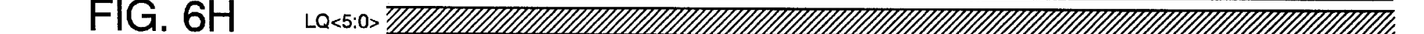
Figure 6I:
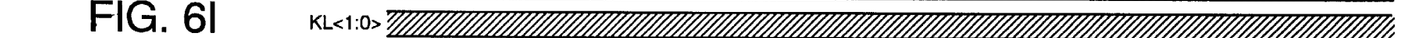
Figure 6J:
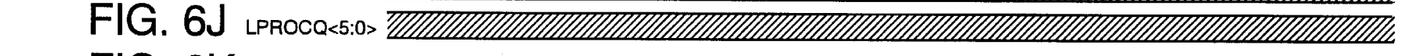
Figure 6K:
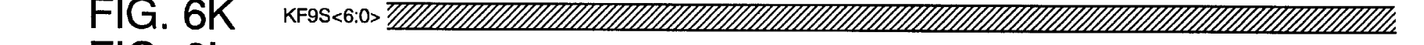
Figure 6L:
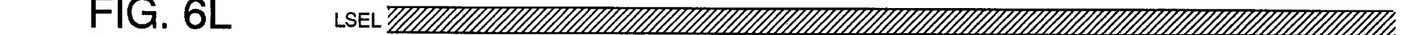
Figure 6M:
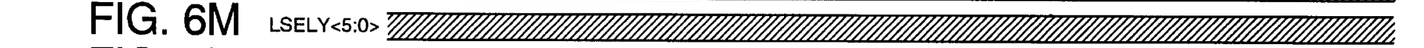
Figure 6N:
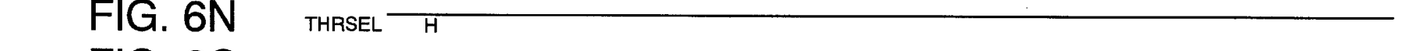
Figure 6O:
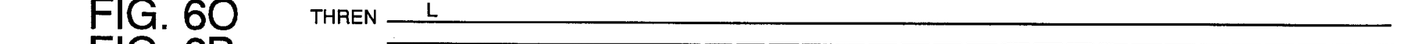
Figure 6P:
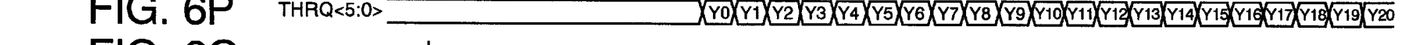

FIG. 3 shows the data expansion circuit 40. FIG. 4 explains the logic of the data expansion for generating the sub video signal for the (⅑) sub window from the sub video signal for the (¹⁄₁₆) sub window. FIGS. 5A~5R are timing charts for the data expansion circuit 40 during generation of the sub video signal for the (⅑) sub window. FIGS. 6A~6R are timing charts of the data expansion circuit during generation of the sub video signal for the (¹⁄₁₆) sub window.

Since the circuit of FIG. 3 operates both during generation of the sub video signal for the (⅑) sub window and during generation of the sub video signal for the (¹⁄₁₆) sub window, the process for generating the sub video signal for the (⅑) sub window is explained first using FIG. 3, FIG. 4 and FIGS. 5A~5R, then the process for generating the sub video signal for the (¹⁄₁₆) sub window is explained using FIG. 3 and FIGS. 6A~6R.

<Sub Video Signal for the (⅑) Sub window>

First, the logic of a "3 to 4" expansion circuit is explained below using the data expansion logic in FIG. 4. The signal sequence Y0, Y1, Y2, Y3, Y4, Y5, Y6, Y7, Y8, Y9, Y10 . . . shown in FIG. 4 is the input signal DIN <5:0> shown in FIG. 5B. The signal sequence Y0, X1, X2, X3, Y3, X5, X6, Y6 . . . shown in FIG. 4 is the signal ZY <5:0> output from the output terminal 74 of the data expansion circuit 40 shown in FIG. 5R.

The input signal DIN <5:0> is represented by Yi (i=a natural number such as 1, 2, 3, 4, . . . ) and the output signal ZY <5:0> is represented by the following formulas:

$Yj = Yj$, $X(j+1) = \frac{1}{2}(\frac{1}{2}Y j + \frac{3}{2}Y(j+1))$, $X(j+2) = (Y(j+1) + Y(j+2))$, $X(j+3) = \frac{1}{2}(\frac{3}{2}Y(j+2) + \frac{1}{2}Y(j+3))$, where, j=3i=0, 3, 6, 9, 12, . . .

Comparing the input signal DIN <5:0> and the output signal ZY <5:0>, Y0, Y3, Y6, Y12 . . . in the output signal ZY <5:0> have the same value as Y0, Y3, Y6, Y12 . . . in the input signal DIN <5:0>, respectively. The X1, X2, X3, X4, X5, X6 . . . in the output signal ZY <5:0> correspond to the respective elements in the input signal DIN <5:0> as shown below.

| ZY <5:0> | DIN<5:0> |
|---|---|
| Y0 | = Y0, |
| X1 | = 1/2(1/2Y0 + 3/2Y1), |
| X2 | = (Y1 + Y2), |
| X3 | = 1/2(3/2Y2 + 1/2Y3), |
| Y3 | = Y3, |
| X4 | = 1/2(1/2Y3 + 3/2Y4), |
| X5 | = (Y4 + Y5), |
| X6 | = 1/2(3/2Y5 + 1/2Y6), |
| Y6 | = Y6, |
| X7 | = 1/2(1/2Y6 + 3/2Y7), |
| X8 | = (Y7 + Y8), |
| X9 | = 1/2(3/2Y8 + 1/2Y9), |
| ......... | |
| ......... | |

The data expansion circuit 40 of FIG. 3 operates as explained below based on the foregoing logic in order to generate the sub video signal for the (⅑) sub window. In FIG. 3, an input terminal 71 receives the input signal DIN <5:0>. The image data stored in the memory 25 is read out at the frequency ¾ $f_{main}$ to generate the sub video signal for the (⅑) sub window. The switching signal RE shown in FIG. 5A instructs reading out of the data from the memory 25 at the frequency ¾ $f_{main}$. By this instruction of the switching signal RE, the switching circuit 70 illustrated in FIG. 2 reads out and outputs the data from the memory 25 at the frequency ¾ $f_{main}$. This input signal DIN < 5:0>output from the switching circuit 70 is shown in FIG. 5B. "<5:0>" means that the signal comprises six bits from 0-th bit to 5-th bit, that is, the 6 bit data includes all the data between 0-th bit and 5-th bit. "<6:1>" means that the signal comprises six bits from first bit to 6-th bit without 0-th bit. That is, the data of <6:1>uses from 1-st bit to 6-th bit data excluding 0-th bit from <6:0> data. The <6:1> data have ½ value of the <6:0> data, since the lowest bit data of the <6:0> data is deleted.

The terminal D of a D flip-flop 41 receives the input signal DIN <5:0> input in the input terminal 71. Then, the D flip-flop 41 outputs the input signal DIN <5:0>, which has existed prior to the rising of a control signal FEN input to a terminal E shown in FIG. 5C, to the terminal Q as FQ <5:0> data in the order of Y0, Y2, Y4, Y6, Y8, Y10, . . . as illustrated in FIG. 5D. The terminal D of a D flip-flop 42 receives the input signal DIN <5:0> input to the input terminal 71. The D flip-flop 42 then further outputs the input signal DIN <5:0>, which has existed prior to the rising of a control signal LEN input to an E terminal shown in FIG. 5G, to the terminal Q as LQ <5:0> in the order of Y1, Y3, Y5, Y7, Y8, Y9, . . . as illustrated in FIG. 5H.

A switching circuit 43 selects the signal LQ <5:0> input to the terminal A when a control signal LSEL shown in FIG. 5L is logic "H", and selects the signal FQ <5:0> input to the terminal B when the control signal LSEL is logic "L". Then, the selected signal is output from the terminal Y as a six bit signal LSELY <5:0>. A terminal "SA" in the switching circuit 43 means that the signal input to the terminal "A" is selected when the signal LSEL input to the switching circuit 43 is logic "H", and that the signal input to the terminal which is not "A", that is, the terminal "B", is selected when the signal LSEL input to the switching circuit 43 is logic "L".

The terminal A of a multiplying circuit 44 receives the signal FQ <5:0> from the output terminal of the D flip-flop 41 and the terminal K receives a control signal KF<1:0>. Then, the multiplying circuit 44 multiplies a constant value corresponding to the control signal KF <1:0> by the FQ <5:0>, and outputs the result to the terminal "Y" as a 7 bit signal Y<6:0>. The table at the lower right of FIG. 3 shows the relationship between the value of the control signal input to the terminal K and the constant value (CAL1). Since the terminal K is a two bit input terminal, the terminal K is indicated as K<1:0>. In the table, (00)h represents 0 in hexadecimal, and (11)h represent 3 in hexadecimal. The control signal KF <1:0> of FIG. 5E, is a decimal number. For example, when the signal FQ <5:0> of FIG. 5C is Y0 and the control signal KF<1:0> is 1, since the constant CAL1 corresponding to 1 in the table K <1:0> is ½, Y0 is multiplied by ½ in the multiplying circuit 44, and a resultant ½Y0 is obtained as a signal Y<6:0> at the terminal Y. The D flip-flop 46 latches the output of the multiplying circuit 44 until the following signal Y <6:0> is output. The signal latched by the D flip-flop 46 is output as a signal FPROCQ <6:0> from the terminal Q.

The terminal A of the multiplying circuit 45 receives the signal LQ <5:0>, and the terminal K receives a control signal KL <1:0> of FIG. 5I. Then, the multiplying circuit 45 multiplies the constant corresponding to the control signal KL <1:0> by the signal LQ <5:0>, and outputs the result as a 7 bit signal Y <6:0> from the terminal Y. Since the process for the constant CAL1 is the same as above, its explanation is omitted. The D flip-flop 47 latches the output of the multiplying circuit 45 until the following signal Y <6:0> is output. The signal latched by the D flip-flop 47 is output as a signal LPROCQ <6:0> from the terminal Q.

The switching circuit 48 selects the FPROCQ <6:0> input to the terminal A when the control signal THRSEL is logic "H", and selects the output signal LSELY <5:0> input to the terminal B from the switching circuit when the control signal THRSEL is logic "L". In order to provide the sub video signal for the (⅑) sub window, this control signal THRSEL is always set to be logic "L", as shown in FIG. 5N. Therefore, in this case, the switching circuit 48 always selects the signal LSELY input to the terminal B side.

The adder 49 adds the 6 bit FPROCQ signal <5:0> of FIG. 5F and the 6 bit LPROCQ signal <5:0> of FIG. 5J. The result of the addition is output as a 7 bit signal KF 9S <6:0> from the terminal Y. The 6 bit signal <5:0> is a 6 bit signal without the most significant bit MSB of the 7 bit signal FPROCQ <6:0> output from the D flip-flop 46. The 6 bit signal <5:0> which is a 6 bit signal without the most significant bit MSB of the 7 bit signal LPROCQ <6:0> output from the D flip-flop 47.

A D flip-flop 51 receives a signal LSELY <5:0> of FIG. 5M output from the switching circuit 48, and latches the LSELY <5:0> upon rise of the signal THREN illustrated in FIG. 5O, and outputs it as a signal THRQ <5:0>.

When a control signal PROCSEL of FIG. 5Q is logic "H", a switching circuit 52 selects the signal KF9S <6:1> branched from the signal KF9S <6:0> of FIG. 5K input to the terminal A. When the control signal PROCSEL of FIG. 5Q is logic "L", the switching circuit 52 selects the output signal THRQ <5:0> of FIG. 5B input to the terminal B from the D flip-flop 51.

A D flip-flop 53 latches the output signal from the switching circuit 52 until the signal from the switching circuit 52 switches. The signal latched in the D flip-flop 53 is transmitted from the terminal Q to the output terminal 74 as a 6 bit output signal ZY <5:0> in the order of Y0, X1, X2, X3, X4, X5, X6, Y6 . . . , as illustrated in FIG. 5R, and then is output from the output terminal 74 as the sub video signal for the (⅑) sub window.

<A Sub Video Signal for the (1/16) Sub window>

In order to generate a sub video signal for the (1/16) sub window, the control signal FEN is logic "L", the control signal KF <1:0> is 2 in decimal, a control signal THRSEL is logic "H", and the control signal ROCSEL is logic "L" as shown in FIGS. 6A~6R. The generation of the sub video signal for the (1/16) sub window is explained below using FIG. 3 and FIGS. 6A~6R.

In FIG. 3, the input signal DIN <5:0> is input to an input terminal 71. In generating the sub video signal for the (1/16) sub window, the image data stored in the memory 25 is read out at the frequency $f_{main}$. Because the switching signal RE shown in FIG. 6A is always logic "L" during the data readout period, the switching signal RE instructs reading out of data from the memory 25 at the frequency $f_{main}$. With this switching signal RE, the switching circuit 70 shown in FIG. 2 reads out data from the memory 25 at the frequency $f_{main}$, and outputs the data to the expansion circuit 40. This output signal DIN <5:0> is illustrated in FIG. 6B. The input signal LEN input as described above for D flip-flop 42 is shwon in FIG. 6G.

Figure 6Q:
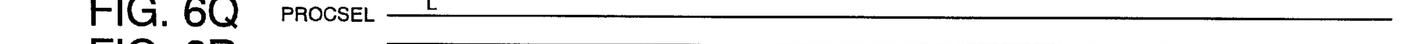
Figure 6R:
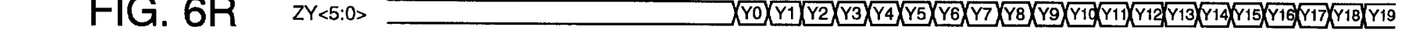

In generating the sub video for the (1/16) sub window, as mentioned above, the control signal PROCSEL is always logic L as shown in FIG. 6Q. Therefore, the signal THRQ <5:0> of FIG. 6Q is always selected in the switching circuit 52. The control signal THRSEL is always logic "H", as shown in FIG. 6N; therefore, the signal FPROCQ <5:0> of FIG. 6F is always selected in the switching circuit 48. Thus, it is not necessary to determine the value of the signal LQ <5:0> of FIG. 6H input to the terminals A of the switching circuit 43 and the multiplying circuit 45, the signal LPROCQ <6:0> of FIG. 6J input to the adder 49, the control signal KL <1:0> of FIG. 6I input to the terminal B of the multiplying circuit 45, and the signal KF9S <6:1> of FIG. 6K input to the switching circuit 52. Moreover, since the switching circuit 48 always selects the signal of the terminal A, it is not necessary to determine the value of the signal LSELY <5:0> of FIG. 6M input to the terminal B of the switching circuit 48, and the control signal LSEL of FIG. 6L also may be any value. The flow of the signal is explained below along the route in which the sub video signal for the (1/16) sub window is generated.

A terminal D of a D flip-flop 41 receives the input signal DIN <5:0> input from the terminal 71. Because the input control signal FEN illustrated in FIG. 6C, is always logic "L", the D flip-flop 41 outputs the input signal DIN <5:0> with a delay by one clock pulse to the terninal Q as a signal FQ <5:0>, as shown in FIG. 6D, in the order of Y1, Y2, Y3, Y4, Y5, Y6, Y7, Y8, Y9, Y10, . . .

The signal FQ <5:0> output from the D flip-flop 41 is input to the terminal A of the multiplying circuit 44. The K terminal of the multiplying circuit 44 receives a control signal KF <1:0>, and the multiplying circuit 44 multiplies the signal FQ <5:0> by a constant corresponding to the control signal KF <1:0>. Then, the multiplying circuit 44 outputs the result of the multiplication from the terminal Y as a 7 bit signal Y <6:0>. As illustrated in FIG. 6E, because the control signal KF <1:0> is constantly 2 in decimal,the constant CAL1 (=1) corresponds to the value of <1:0> 2 in the table shown at the lower right in FIG. 3. Therefore, the output signal Y <6:0> of the multiplying circuit 44 becomes the same as the value of the signal FQ <5:0>. The signal latched at the D flip-flop 46 is output from the terminal Q as a signal FPROCQ <6:0>.

Because the control signal THRSEL is logic "H" as shown in FIG. 6N, the switching circuit 48 selects the signal FPROCQ <5:0> branched from the FPROCQ <6:0> input to the terminal A from the D flip-flop 46.

Because the signal THREN input to the terminal E is constantly logic "L" as shown in FIG. 6O, the D flip-flop 51 shifts the signal FPROCQ input to the terminal D by one bit, and outputs THRQ <5:0> of FIG. 6P from the output terminal Q of the D flip-flop 51.

Because the control signal PROCSEL is constantly logic "L" as shown in FIG. 6Q, the switching circuit 52 selects and outputs the signal THRQ <5:0> input to the terminal B. The D flip-flop 53 latches the output signal of the switching circuit 52 until the output signal of the switching circuit 52 is switched. The signal latched in the D flip-flop is transmitted from the terminal Q to the output terminal 74 as a six bit output signal ZY <5:0> as shown in FIG. 6R in the order of Y0,Y1, Y2, Y3, Y4, Y5, Y6, . . . , and is output as the sub video signal for the (1/16) sub window.

What is claimed is:

1. An image processing device for displaying a sub window of second video data on one part of a main screen by switching first video data for all of the main screen and the second video data for the sub window, said image processing device comprising:

an analog-to-digital converter for digitizing the second video data to produce digitized second video data at a frequency $f_{sub}$;

a data sampling circuit for sampling and compressing the digitized second video data at a subsampling frequency $(1/n)$ $(f_{sub})$, where n is a positive integer;

a memory for reading out and storing the digitized second video data sampled and compressed by said data sampling circuit;

a first switching circuit including a data expansion circuit for generating video data for the sub window by expanding the digitized second video data read out from said memory by m/n, where m is a positive integer not equal to n, said first switching circuit switching between expanding the digitized second video data read out from said memory in said data expansion circuit by (m/n) to generate $1/m^2$ sub window video data, and reading out the digitized second video data from said memory without expansion in said data expansion circuit to generate $1/n^2$ sub window video data;

a digital-to-analog converter for converting image data expanded by said data expansion circuit to produce analog data; and a second switching circuit for switching video data for the sub window output from said digital-to-analog converter to insert the video data for the sub window into the first video data.

2. The image processing device according to claim 1 wherein said m is 3 and n is 4.

3. The image processing device according to claim 1, wherein said data expansion circuit generates video data for the sub window when the digitized second video data read out from said memory is Yi (i=0, 1, 2, 3 . . . ) of $$Yj=YJ,$$
$$X(j+1)=\frac{1}{2}(\frac{1}{2}Yj+\frac{3}{2}Y(j+1)),$$
$$X(j+2)=(Y(j+1)+Y(j+2)),$$
$$X(j+3)=\frac{1}{2}(\frac{3}{2}Y(j+2)+\frac{1}{2}Y(j+3)),$$

where, j=3i=0, 3, 6, 9, 12, . . . .

4. The image processing device according to claim 1 wherein said data expansion circuit comprises:

a first path for directly outputting digitized video data;

a second path including a first multiplying circuit for multiplying the digitized video data by a first constant defined by a first control signal to produce a first product, a second multiplying circuit for multiplying the digitized video data by a second constant defined by a second control signal to produce a second product, an adder for adding the first and second products to produce a sum, and a circuit for dividing the sum by two; and a third switching circuit for selecting the first path or the second path.

5. The image processing device according to claim 4 wherein the first and second constants correspond to respective values of the first and second control signals input to said first and second multiplying circuits as follows:

| [Values] Value of first [and] or second control [signals] signal | [First and second constants] Constant |
|---|---|
| 0 | 0 |
| 1 | 1/2 |
| 2 | 1 |
| 3 | 3/2. |

6. The image processing device according to claim 1 wherein said data expansion circuit comprises:

a first D flip-flop for receiving the digitized second video data at a first input terminal, and receiving a first control signal at a second input terminal, and outputting an image signal from an output terminal according to the first control signal;

a second D flip-flop for receiving the digitized second video data at a first input terminal and receiving a second control signal at a second input terminal, and outputting an image signal from an output terminal according to the second control signal;

a third switching circuit for selecting between the image signal from the first D flip-flop and the image signal from the second D flip-flop according to a third control signal and producing an output;

a first multiplier for multiplying the digitized second video data by a first constant corresponding to a fourth control signal and producing an output;

a second multiplier for multiplying the by a second constant corresponding to a fifth control signal;

a third D flip-flop for latching the output of said first multiplier and producing an output;

a fourth D flip-flop for latching an output of said second multiplier and producing an output;

a fourth switching circuit for selecting between the output of said third switching circuit and the output of said third D flip-flop according to a sixth control signal and producing an output;

an adder for adding the outputs of said third D flip-flop and said fourth D flip-flop;

a fifth D flip-flop for latching the output of said fourth switching circuit according to a seventh control signal and producing an output;

a fifth switching circuit for selecting between the output of said fifth D flip-flop and the output of said adder according to an eight control signal and producing an output; and a sixth D flip-flop for latching the output of the fifth switching circuit wherein the input image signal is expanded by 4/3 in response to the first through eighth control signals.

7. The image processing device according to claim 6 wherein; the first and second constants correspond to respective values of the fourth and fifth control signals input to said first and second multiplying circuits as follows:

| [Values] Value of [first and second] fourth and fifth control [signals] signal | [First and second constants] Constant |
|---|---|
| 0 | 0 |
| 1 | 1/2 |
| 2 | 1 |
| 3 | 3/2. |

8. The image processing device according to claim 6 wherein, the first control signal is logic "L", the third control signal is decimal 2, the sixth control signal is logic "H", the seventh control signal is logic "L", and the eighth control signal is logic "L" for generating a (1/16) sub window.

* * * * *